Sept. 24, 1957 L. HABER 2,807,795
PHYSICIAN'S AUTOMOBILE BLINKER LIGHT
Filed Sept. 2, 1955 2 Sheets-Sheet 1
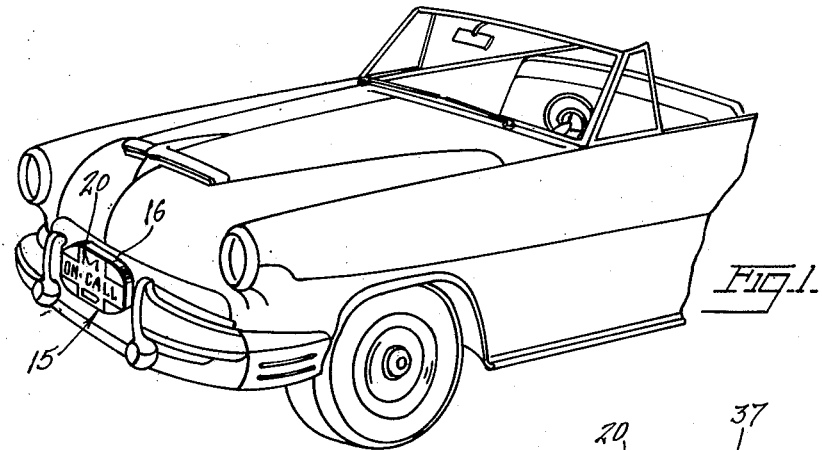
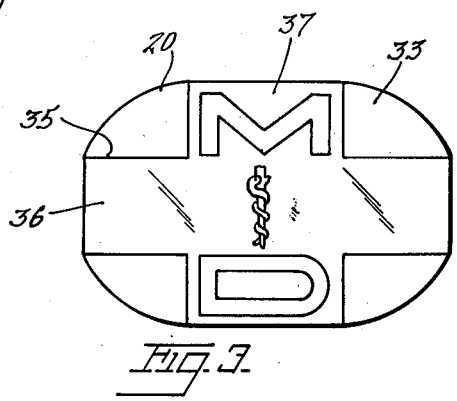
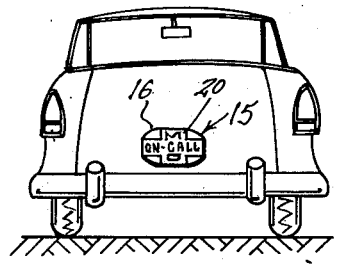
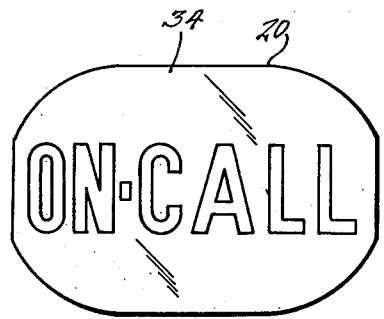
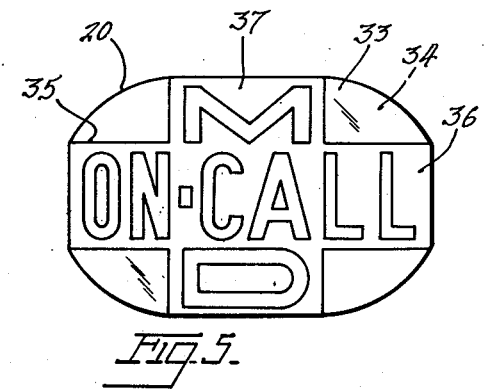
INVENTOR.
LEONARD HABER
BY
ATTORNEY Sept. 24, 1957 — L. HABER — 2,807,795
PHYSICIAN'S AUTOMOBILE BLINKER LIGHT
Filed Sept. 2, 1955 — 2 Sheets-Sheet 2

INVENTOR
LEONARD HABER
BY
ATTORNEY

United States Patent Office 2,807,795
Patented Sept. 24, 1957

2,807,795
PHYSICIAN'S AUTOMOBILE BLINKER LIGHT

Leonard Haber, Brooklyn, N. Y.

Application September 2, 1955, Serial No. 532,225

3 Claims. (Cl. 340—107)

This invention relates to new and useful improvements in safety signal and warning devices for motor vehicles.

More particularly, the present invention proposes the construction of an improved safety signal for the motor vehicles of physicians who are forced to double-park at night when on emergency calls.

As a further object, the present invention proposes forming the signal device so that it not only will be serviceable at night but will be decorative and easily readable in the daytime as well.

Another object of the invention proposes constructing the signal device with a housing removably secured to a motor vehicle and having a translucent panel with one warning indicia on the rear face and another complementary indicia on the front face constructed and arranged to coact with the warning indicia on the back face when the back face and the panel are illuminated from the housing.

Still another object of the present invention proposes forming the device with electric bulbs and sockets in the housing connected through a flasher relay with the electric source of a motor vehicle.

Another object of the invention proposes constructing the device with a warning light mounted on the instrument panel of the motor vehicle to show when the lamps are being energized and a switch mounted on the same instrument panel to connect and disconnect the relay with the source of electric energy in the motor vehicle.

A further object of the invention proposes forming the device with means to connect the relay with the closed circuit part of the ignition switch of a motor vehicle so that when the doctor is visiting a patient the signal will be working even though the ignition will be off in the motor vehicle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of an automobile and a safety signal device constructed and arranged in accordance with the present invention and mounted on the front of the car and in operating condition.

Fig. 2 is a view similar to Fig. 1 but showing the device mounted on the rear of an automobile.

Fig. 3 is a front view of the translucent panel of the device shown in Figs. 1 and 2.

Fig. 4 is a view of the same panel but showing only the signal indicia marked on the rear face of the panel.

Fig. 5 is a front view of the panel shown in Figs. 3 and 4 but illuminated and without the emblem shown in Fig. 3.

Figure 6:
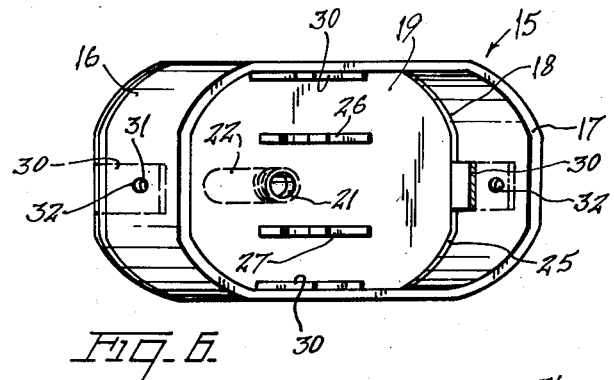
Fig. 6 is a perspective view of the housing of the device.

Referring more particularly to the drawings, the safety signal device is designated generally by the reference numeral 15.

Signal device 15 has a hollow housing 16 (Fig. 6) with a front opening 17 and a rear opening 18. A rear plate 19 is mounted on the housing 16 over the rear opening 18 and a translucent plate 20 is mounted on the housing 16 over the front opening 17.

Figure 8:
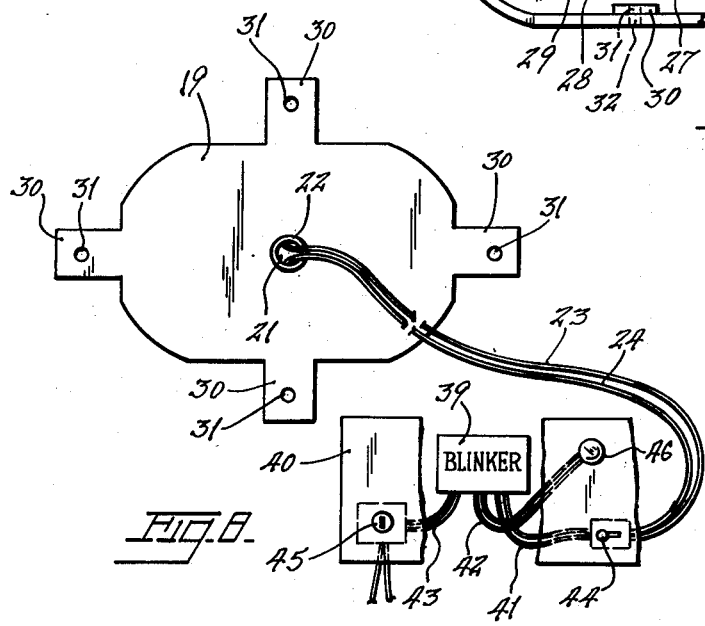
Fig. 8 is a rear view of the rear plate and a diagrammatic view of parts electrically connected with the lamps shown in Fig. 7.

Rear plate 19 has a central opening 21 and a threaded pipe 22 (Fig. 8) is connected, as by welding, to the back of the rear plate and in the opening 21. Insulated wires 23 and 24 extend through the pipe.

Figure 7:
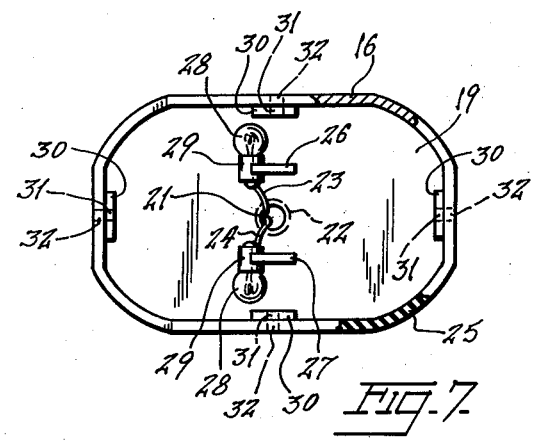
Fig. 7 is a front view of the rear plate for the housing and parts secured thereto, parts being broken away and in section.

A water proof resilient ring gasket 25 (Fig. 7) is disposed between the rear plate 19 and the housing 16. Two shelves 26 and 27 are mounted on the rear plate 19 and are disposed inside the housing 16. Lamps 28 and sockets 29 are secured to these shelves 26 and 27 and are disposed inside the housing 16. Insulated wires 23 and 24 are connected with the bulbs 28 and sockets 29.

Rear plate 19 has a plurality of tongues 30, the tongues and back plate being perferably stamped out of metal in one operation. Tongues 30 have screw holes 31 and are adapted to be bent to fit inside the housing 16 to hold the translucent plate 20 in the housing. Preferably the back plate and housing are both of metal. A screw hole 32 is provided on each side of the housing 16 for securing the tongues 30.

The translucent plate 20 has a front face 33 and a rear face 34. A medical cross 35 with horizontal bar 36 and vertical bar 37 is marked on the front face 33. Also marked on the front face are the letters "M D," the "M" being marked at the upper end of the vertical bar 37 of the medical cross 35 and the "D" being disposed at the lower end of the vertical bar 37. In the center of the medical cross may be marked in outline form a caduceus emblem.

On the rear face 34 of the translucent plate 20 and disposed so as to appear on the horizontal bar 36 of the medical cross 35 on the front face of the plate 20 when the plate is illuminated by the lamps 28 is the warning indicia "On Call."

A blinker or flasher relay 39 (Fig. 8) is attached to the underside of the instrument panel 40 of a motor vehicle and is connected to the electric power source in the vehicle. The flasher has three sets of wires 41, 42 and 43.

One set of wires, set 41, is connected to a separate toggle switch 44 having two outlets and which is also attached to the instrument panel 40.

Wire set 43 extends from the flasher relay to the closed circuit part of the ignition switch 45 of the motor vehicle so that the signal will operate even though the ignition has been turned off by the ignition key.

The third set of wires, 42, may be connected to a separate signal or pilot light 46 on the instrument panel 40. This warning light 46 will show when the signal device is working and when the toggle switch 44 is in its "on" position. An occupant of the motor vehicle can also tell audibly when the signal device is operating by the clicking of the flasher relay under the instrument panel.

The insulated wires 23 and 24 are connected with the toggle switch 44 on the instrument panel running through the floor board of the vehicle and extending all the way to the sockets and bulbs in the housing.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A safety signal for automobiles comprising a hollow housing adapted to be attached to a motor vehicle, said housing having a front opening, a translucent panel mounted on the housing over the front opening, said panel having front and rear faces, said rear face being disposed facing the housing with warning indicia thereon not readily visible through the front face, illuminating means in the housing to illuminate the translucent panel and make the warning indicia visible through the front face, a flasher relay for illuminating the illuminating means intermittently, and a switch connected with the flasher relay for the illuminating means and mountable on the instrument panel of a motor vehicle, said warning indicia being "On Call," said other indicia on the front face of the translucent panel being a medical cross and the letters "M D," said warning indicia "On Call" being disposed on the rear face to appear on the horizontal bar of the medical cross on the front face when the translucent panel is illuminated, said letters "M D" on the front face of the translucent panel being disposed on the vertical bar of the medical cross, the "M" appearing at one end of the vertical bar and the "D" at the other end of the vertical bar of the medical cross, and a caduceus emblem in outline form on the front face of the translucent panel in the center of the medical cross.

2. A safety signal for automobiles comprising a hollow housing adapted to be attached to a motor vehicle, said housing having a front opening, a translucent panel mounted on the housing over the front opening, said panel having front and rear faces, said rear face being disposed facing the housing with warning indicia thereon not readily visible through the front face, illuminating means in the housing to illuminate the translucent panel and make the warning indicia visible through the front face, a flasher relay for illuminating the illuminating means intermittently, and a switch connected with the flasher relay for the illuminating means and mountable on the instrument panel of a motor vehicle, said housing having a rear opening, a back plate connected with the housing and disposed over the rear opening, and a resilient gasket between the back plate and the housing, said illuminating means being electric sockets and bulbs secured to the back plate and disposed in the housing, said flasher relay being connected to the closed circuit part of the ignition switch on a motor vehicle for operation of the illuminating means even though the ignition is turned off.

3. A safety signal for automobiles comprising a hollow housing adapted to be attached to a motor vehicle, said housing having a front opening, a translucent panel mounted on the housing over the front opening, said panel having front and rear faces, said rear faces being disposed facing the housing with warning indicia thereon not readily visible through the front face, illuminating means in the housing to illuminate the translucent panel and make the warning indicia visible through the front face, a flasher relay for illuminating the illuminating means intermittently, and a switch connected with the flasher relay for the illuminating means and mountable on the instrument panel of a motor vehicle, said housing having a rear opening, a back plate connected with the housing and disposed over the rear opening, a resilient gasket between the back plate and the housing, said illuminating means being electric sockets and bulbs secured to the back plate and disposed in the housing, said flasher relay being connected to the closed circuit part of the ignition switch on a motor vehicle for operation of the illuminating means even though the ignition is turned off, and a pilot light connected to the flasher relay and mountable on the instrument panel of a motor vehicle to indicate when the illuminating means and flasher relay is energized.

References Cited in the file of this patent

UNITED STATES PATENTS

| 1,670,548 | O'Kelly | May 22, 1928 |
| 2,072,439 | Andreas | Mar. 2, 1937 |
| 2,225,732 | Bedford | Dec. 24, 1940 |